Nov. 10, 1936.     R. P. HANSON     2,060,571
VALVE
Filed May 14, 1934

INVENTOR
R. P. HANSON
BY C. B. Bickenbeul.
ATTORNEY

Patented Nov. 10, 1936

2,060,571

UNITED STATES PATENT OFFICE 2,060,571

VALVE

Robert P. Hanson, Portland, Oreg., assignor to Electric Steel Foundry Company, Portland, Oreg.

Application May 14, 1934, Serial No. 725,610

2 Claims. (Cl. 251—51)

This invention relates generally to valves, and particularly to gate valves.

The main object of this invention is the provision of an improved form of gate valve for handling liquids in which an appreciable amount of solids is carried in suspension.

The second object is to construct a gate valve which will not be rendered inoperative due to the accumulation of solids in the gate recess.

The third object is to construct a gate valve in which the scouring action produced by liquids passing through the valve is minimized.

These, and other objects, will become more apparent from the specification following as illustrated in the accompanying drawing, in which.

Similar numbers of reference refer to similar parts throughout the several views.

Figure 1:
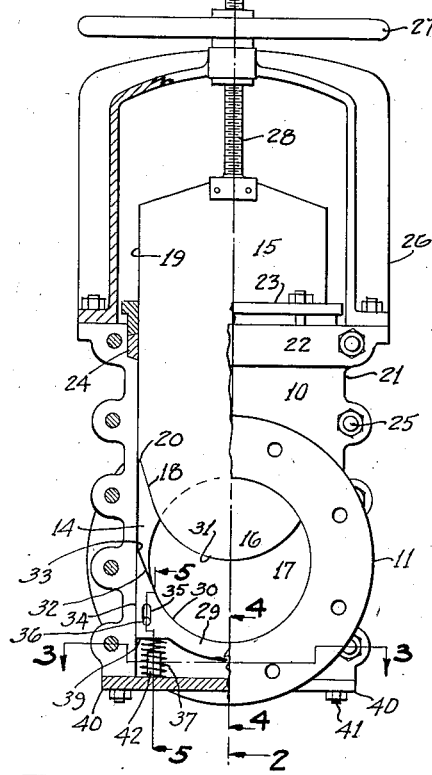
Fig. 1 is a front elevation of the valve with parts broken away in vertical section.
Figure 2:
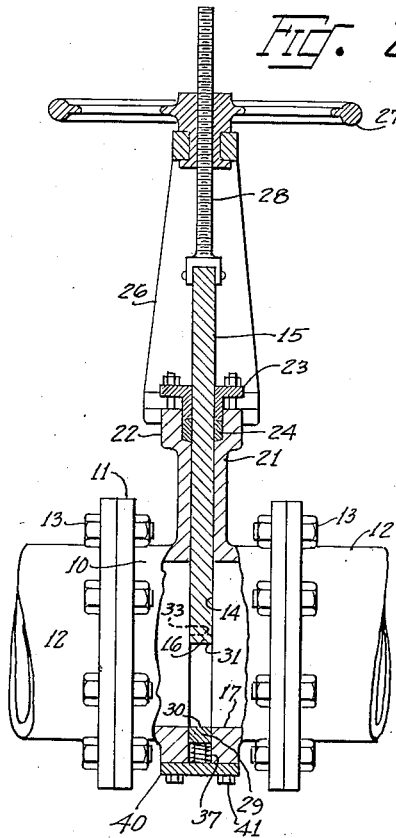
Fig. 2 is a vertical section taken along the line 2—2 in Fig. 1.
Figure 3:
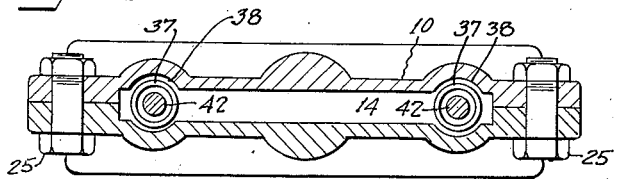
Fig. 3 is a horizontal section along the line 3—3 in Fig. 1.
Figure 4:
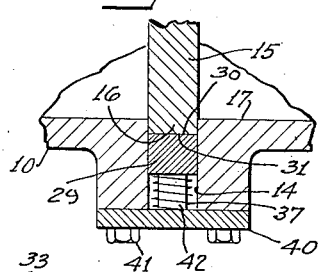
Fig. 4 is a fragmentary vertical section along the line 4—4 in Fig. 1 showing the gate in a closed position.
Figure 5:
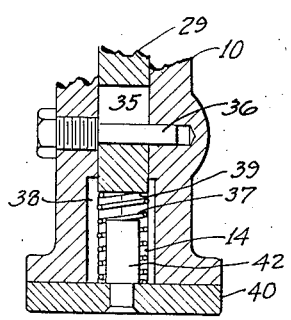
Fig. 5 is a section taken along the line 5—5 in Fig. 1 showing the gate in an open position.
Figure 6:
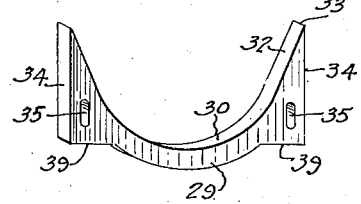
Fig. 6 is a perspective view of the gate follower.

Referring in detail to the drawing, there is shown a valve body 10 provided with the usual flanges 11 by means of which the valve is interposed between the pipe sections 12 and secured thereto by the bolts 13. The valve body 10 has formed therethrough a rectangular slot 14 which forms a guide for the gate 15 whose lower end 16 is rounded to conform with the lower portion of the valve opening 17, and the end 16 is connected by the tangent lines 18 to the sides 19 of the valve 15 by a small shoulder 20 which is used for scraping purposes.

The valve body 10 is extended laterally along the gate 15 in the form of a rectangular neck 21 at whose end is formed a stuffing box 22 which receives the gland 23 by means of which the packing 24 is held against the gate 15.

The valve body 10 is split transversely through the neck 21 for construction purposes, the halves being joined by means of the bolts 25. To the neck 21 is secured a yoke 26 on whose upper end is journaled a hand wheel 27 through which is threaded a screw 28 whose lower end is attached to the gate 15. Obviously, any other form of gate operating mechanism can be employed without departing from the spirit of this invention.

With the exception of the precise form of gate end 16 the device thus far described is quite similar to devices now on the market.

The improvement which I am about to describe resides in a gate follower 29 which is disposed in the slot 14 and, in reality, constitutes an extension for the gate 15. The member 29 is curved on its edge 30 to conform approximately with the edge 31 of the gate 15, except that it will be found desirable to run the tangent sides 32 to a chisel-shaped point 33 at the intersection with the parallel sides 34.

The follower 29 is provided with slots 35 into which extend the stop pins 36. The follower 29 is normally urged upwardly by the springs 37 which are confined within the enlarged recess 38 between the shoulders 39 of the follower 29 and the cover plate 40, which is secured across the follower end of the slot 14 by means of the bolts 41. The springs 37 are mounted on the posts 42 which also serve as stops for the follower 29.

It can be seen from the foregoing that in the operation of the valve when it is in an open position (as shown in Fig. 1) the follower 29 moves to its innermost limit imposed by the stop pins 36, under the urging of the springs 37. It is assumed that paper mill stock or other liquid containing an appreciable quantity of solids, is passing through the valve. Obviously, this material cannot accumulate in the space occupied by the follower 29, nor can it exert a scouring action against the walls of the slot 14, thereby greatly adding to the life of the valve.

When the valve is closed by the rotation of the hand wheel 27, or any other mechanism used, the gate 15 moves across the opening 17 until the edge 31 engages the edge 30 of the follower 29, and the continued movement of the gate 15 moves the follower 29 out of the way and the gate end 16 occupies a portion of the space formerly occupied by the follower 29, completing the seating of the valve.

Much difficulty is experienced, especially in paper mill work, when fibrous particles accumulate in the gate pockets and the accumulation is solidified by each closing of the valve until it actually prevents its closing, or permits the valve to be injured by its closing mechanism.

I claim:

1. A gate valve of the class described in which the gate consists of a flat plate adapted to slidably pass through a stuffing box, the sides of which are parallel, the innermost ends of the edges of said plate being provided with scrapers and a follower for said valve conforming in shape to the end of said gate.

2. In a gate valve of the class described, a body including a stuffing box, said body and stuffing box forming a guide of rectangular cross section extending across the valve opening, a gate consisting of a flat plate within said guide and extending through said stuffing box and having a rounded end adapted to form a closure for the valve opening, said rounded end terminating in two tangent edges which terminate in shoulders at the edges of the gate, and a spring urged follower for said gate having parallel edges and having stops for limiting the movement of said follower to the edge of the valve opening, the edge of said follower adjacent to said gate conforming to the shape of said gate in order to prevent the packing of fibrous material between said gate and follower.

ROBERT P. HANSON.